US008497449B1

(12) United States Patent
Budd et al.

(10) Patent No.: US 8,497,449 B1
(45) Date of Patent: Jul. 30, 2013

(54) MICRO-MACHINING OF CERAMICS USING AN YTTERBIUM FIBER-LASER

(75) Inventors: Richard W. Budd, Redford, MI (US); Brett A. Moon, South Lyon, MI (US)

(73) Assignee: Synchron Laser Service Inc., Plymouth, MI (US)

( * ) Notice: Subject to any disclaimer, the term of this patent is extended or adjusted under 35 U.S.C. 154(b) by 1692 days.

(21) Appl. No.: 11/870,570

(22) Filed: Oct. 11, 2007

Related U.S. Application Data (63) Continuation of application No. 11/750,747, filed on May 18, 2007, now abandoned.

(60) Provisional application No. 60/808,660, filed on May 26, 2006.

(51) Int. Cl.
*B23K 26/18* (2006.01)

(52) U.S. Cl.
USPC ..................... 219/121.69; 264/400

(58) Field of Classification Search
USPC ..................... 264/400; 219/121.69
See application file for complete search history.

(56) References Cited

U.S. PATENT DOCUMENTS

| | | | | |
|---|---|---|---|---|
| 4,870,377 A | * | 9/1989 | Brown et al. | 333/238 |
| 5,169,678 A | * | 12/1992 | Cole et al. | 427/555 |
| 5,267,856 A | * | 12/1993 | Wolbarsht et al. | 606/10 |
| 5,411,583 A | * | 5/1995 | Bennison et al. | 106/14.05 |
| 6,097,741 A | * | 8/2000 | Lin et al. | 372/6 |
| 6,151,338 A | | 11/2000 | Grubb et al. | |
| 6,433,306 B1 | | 8/2002 | Grubb et al. | |
| 6,653,210 B2 | * | 11/2003 | Choo et al. | 219/121.72 |
| 6,727,458 B2 | | 4/2004 | Smart | |
| 6,784,399 B2 | * | 8/2004 | Dunsky et al. | 219/121.68 |
| 2002/0003261 A1 | * | 1/2002 | Murata et al. | 257/359 |
| 2002/0033558 A1 | * | 3/2002 | Fahey et al. | 264/400 |
| 2002/0043734 A1 | * | 4/2002 | Ohji et al. | 264/43 |
| 2003/0103108 A1 | | 6/2003 | Liu et al. | |
| 2003/0127439 A1 | * | 7/2003 | Wee et al. | 219/121.73 |
| 2003/0226832 A1 | * | 12/2003 | Liu et al. | 219/121.69 |
| 2005/0042805 A1 | | 2/2005 | Swenson et al. | |
| 2005/0099835 A1 | * | 5/2005 | Swenson et al. | 365/63 |
| 2006/0169362 A1 | * | 8/2006 | Sakai et al. | 148/110 |
| 2006/0228650 A1 | * | 10/2006 | Matsuo et al. | 430/311 |
| 2010/0133242 A1 | * | 6/2010 | Lind et al. | 219/121.61 |

FOREIGN PATENT DOCUMENTS

| | | | |
|---|---|---|---|
| GB | 2349106 A | * | 10/2000 |
| JP | 61-182894 A | * | 8/1986 |
| JP | 7-185876 A | * | 7/1995 |
| JP | 7-204871 A | * | 8/1995 |
| JP | 2006-175509 A | * | 7/2006 |

OTHER PUBLICATIONS

Ihlemann et al., "Nanosecond and femtosecond excimer-laser ablation of oxide ceramics", Jan. 1995, Applied Physics A, vol. 60, pp. 411-417.*

(Continued)

*Primary Examiner* — Geoffrey S Evans
(74) *Attorney, Agent, or Firm* — McGarry Bair PC (57) ABSTRACT

A method of micro-machining comprises the steps of selectively applying a light energy coupling substance to a substrate, the light energy coupling substance absorbing a selected level of laser light energy at a selected wavelength, directing a laser light beam at the selected wavelength against the substrate in areas to which the light energy coupling substance has been applied, and manipulating one of the laser light beam and the substrate to micro-machine selected features into the substrate with the laser light beam.

15 Claims, 7 Drawing Sheets

OTHER PUBLICATIONS

Pask et al., "Ytterbium Doped Silica Fiber Lasers: Versatile Sources for the 1-1.2 micron Region", Apr. 1995, IEEE, IEEE Journal of Selected Topics in Quantum Electronics,pp. 2-13.*

Qunitero et al., "Nd:YAG laser cutting of advanced ceramics", Dec. 2001, SPIE, Proceedings of SPIE, vol. 4419 , pp. 756-760.*

Swiderski et al., "High Power diode pumped Yb-doped silica fiber laser generating in near infrared range", Proceedings of SPIE, vol. 5484, pp. 388-391.*

Machine translation of Japan Patent document No. 2006-175,509, Feb. 2013.*

Machine translation of Japan Patent document No. 7-185,876, Feb. 2013.*

Machine translation of Japan Patent document No. 7-204,871, May 2013.*

2005 CoorsTek Publication; 8510-1243: Ceramics-for-Lasers. pp. 1-2, Dec. 2005.

Alumina: Sintering and Optical Properties; J.G.J. Peelen, PhD Thesis, Technical University of Eindoven, Netherlands, May 1977.

* cited by examiner

MICRO-MACHINING OF CERAMICS USING AN YTTERBIUM FIBER-LASER

CROSS-REFERENCE TO RELATED APPLICATION

This application is a continuation of U.S. application Ser. No. 11/750,747, filed May 18, 2007, which claims the benefit of U.S. provisional application Ser. No. 60/808,660, filed May 26, 2006, both of which are incorporated herein in their entirety.

BACKGROUND OF THE INVENTION

1. Field of the Invention

This invention relates generally to the micro-machining of ceramic substrates.

2. Description of the Related Art

Integrated circuits designed to dissipate more than about a half watt of power are often mounted on ceramic substrates. These ceramic substrates are typically fabricated of bulk-crystalline alumina composed of 95 to 99 percent pure aluminum oxide ($Al_2O_3$), are opaque, and are typically supplied in a white, or off white, color. Other substrate materials can include aluminum nitride which is a better conductor of heat than aluminum oxide. However, aluminum nitride substrates are considerably more expensive than aluminum oxide substrates. The substrate material is supplied in thin sheets that are micro-machined to very exacting tolerances.

Conventional ceramic substrates are fabricated by drilling vias, i.e. holes, with a laser, printing and plating circuit board components on the substrate, and cutting the substrates utilizing a diamond saw into several different pieces to form individual circuit boards from the larger substrate blank material. Using a diamond saw, the processing speed is in the neighborhood of 18 inches per minute. A diamond saw cuts a kerf in the substrate having a width in excess of 25 microns.

Traditionally, carbon dioxide ($CO_2$) lasers are used to produce machined features in alumina as small as 5 mil (0.005"). These lasers can have a power rating of from 500 to 1000 watts. $CO_2$ lasers have the advantage of high productivity in the machining process. The laser operates by ablating the substrate material with a tightly focused and controlled beam of far-infrared (FIR) light. The laser is typically operated by on-off pulsing accompanied by manipulation of the substrate in order to create a break-line, a via, or other selected structural features.

When the laser is "on," the substrate material is ablated, leaving a depression in the surface of the substrate, or a via extending completely through the substrate. When the laser is "off," the substrate can be positioned for a subsequent "on" pulse, with the process being repeated in order to form the selected feature. For example, a break-line can be defined by a line of circular cavities or depressions formed in the substrate, which are created by a succession of "on" pulses of sufficient power and duration to melt and ablate the substrate material. As an example, the duration of the "on" pulse can be 50 millionths of a second, i.e. $50 \times 10^{-6}$ second. The duration of the" off pulse can be 5 times the duration of the "on" pulse; in the example, 250 millionths of a second, i.e. $250 \times 10^{-6}$ second.

The wavelength of the light produced by the $CO_2$ laser is 10.6 micron (0.000417 inch). The $CO_2$ laser has high power, but the light beam focus is too large, which creates relatively large vias and perforation lines. This beam size thus establishes a specific absolute minimum size of the features that can be machined using the $CO_2$ laser, along with absolute limits to machined edge tolerances. For $CO_2$ lasers in a production environment, this minimum feature size is 4-5 mil with edge tolerances of +/−1 mil. Using special techniques, features as small as 3 mil, with edge tolerances of +/−0.5 mil, are possible, but these techniques are not reliable enough to meet high-volume production requirements.

Mid-infrared lasers, such as alexandrite lasers, specialized gas lasers, and lead salt lasers typically emit light in wavelengths ranging from 2 to 5 micron. These lasers are typically inefficient, and have low-power outputs.

Near-infrared lasers, such as Yb:YAG lasers (ytterbium-doped yttrium aluminium garnet lasers) emit light in wavelengths of 1.7 to 1.8 microns. YAG lasers have wavelengths of 1.64 microns. These lasers can have very high power outputs, but typically suffer from beam structure, i.e. mode, instabilities.

The high beam quality and power of $CO_2$ lasers have made them the principal laser used in the electronics ceramics processing industry. However, the electronics industry is now requiring smaller and more accurate feature sizes than can be produced using existing and foreseeable $CO_2$ laser technology.

The only currently recognized solution for producing finer feature sizes is to use shorter wavelength lasers. While some shorter wavelength lasers are capable of greater precision, their throughput, or production rates, are far too low to be considered for any high-volume production requirements. Currently, the only types of laser that can produce enough power to be practical for mass-production of ceramic electronic components are those producing near-infrared (NIR) wavelengths, in the range of approximately 1.06 to 1.095 micron. Until very recently, however, use of these lasers was infeasible because of poor and unstable beam quality when operating at required power levels.

The most common example of an industrial laser that operates in the NIR range is a Nd:YAG laser (i.e. a neodymium-doped yttrium aluminium garnet laser) which emits light at a wavelength of 1.064 micron (0.000,042 inch). However, Nd:YAG lasers produce a variable and low-quality beam shape, precluding the satisfactory micro-machining of alumina at high-volume production rates.

Besides low throughput, another drawback to non-$CO_2$ lasers is that alumina is highly reflective (greater than 90 percent) at ambient temperatures. Alumina is also translucent at shorter near-infrared wavelengths, so that the light at such wavelengths passes through the substrate and performs no manufacturing operations thereon. This greatly inhibits the coupling of the laser power to the material, and can interfere with the operation of the laser itself. Furthermore, as the temperature of alumina rises, it becomes relatively transmissive to the light beam—in excess of 90 percent—so that laser energy is not readily coupled with the material.

Conventional $CO_2$ lasers do not exhibit such problems because alumina is a good absorber (near 100 percent) of laser energy at long, i.e. 10.6 micron, wavelengths, regardless of temperature. As a result of the limitations in NIR lasers, the electronics ceramics processing industry has been unable to realize the benefits of using lasers that emit in the near-infrared band.

Additionally, current methods present limitations that can preclude post-scribing operations on nearly finished assemblies. This leaves only three alternative methods to achieve singulation of such assemblies: the use of wet diamond-saws, the use of UV and/or green-blue lasers, or the use of ultra-fast lasers. Each of these methods is very precise and produces a cleanly machined structure, but these methods are also very slow and therefore expensive employ per unit produced. As a result, post-process singulation using saws or other low-damage methods is typically reserved for high-value components that must have an exceptionally low scrap rate to be economically viable.

SUMMARY OF THE INVENTION

A method of micro-machining comprises the steps of selectively applying a light energy coupling substance to a substrate, the light energy coupling substance absorbing a selected level of laser light energy at a selected wavelength, directing a laser light beam at the selected wavelength against the substrate in areas to which the light energy coupling substance has been applied, and manipulating one of the laser light beam and the substrate to micro-machine selected features into the substrate with the laser light beam.

DESCRIPTION OF EMBODIMENTS OF THE INVENTION

Figure 1:
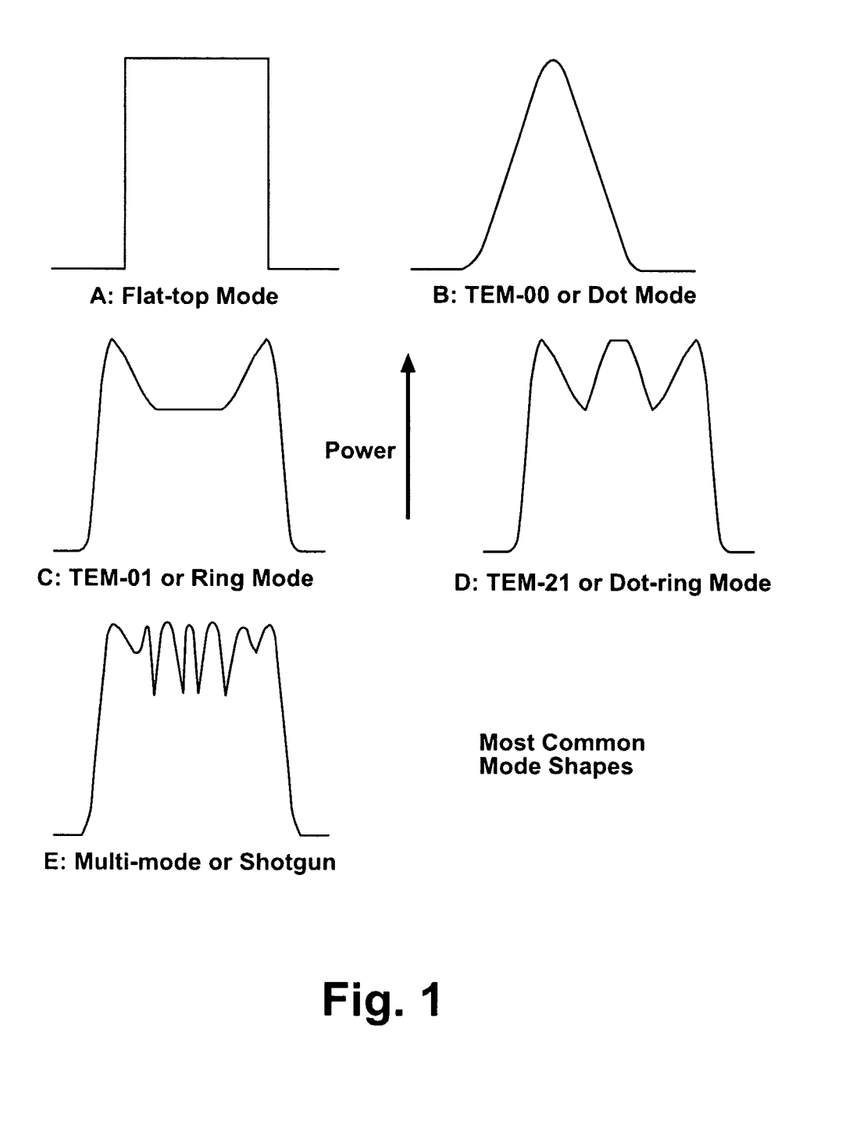
FIG. 1 is an illustration of typical energy profiles produced by selected lasers.

The invention comprises an ytterbium fiber laser directing a light beam having a near-infrared (NIR) wavelength with a TEM-00 or Gaussian/dot beam shape onto a substrate to which has been applied a wavelength-specific light energy coupling substance to facilitate the ablative micro-machining of the substrate. FIG. 1 provides examples of the various mode shape that are typically produced by lasers. FIG. 1B illustrates an optimal shape for the micro-machining operation described herein. The TEM-00 mode, or dot-mode, focuses to a single point, whereas all other shapes focus to a much larger area that is always an image of the beam shape. Smaller focus translates into finer control of the laser beam and means a greater energy density applied to the material being processed.

The laser light beam should be stable at a wavelength in the range of 1.07 to 1.095 micron (0.000,0421-0.000,043 inch). When used in conjunction with conventional focusing systems, a theoretical 10-fold feature size reduction can be realized, compared with conventional $CO_2$ lasers.

According to the invention, a ceramic substrate is treated with a light energy coupling substance that absorbs energy at a selected wavelength, thereby reducing the reflectivity of the substrate. In a preferred embodiment, an alumina substrate is treated with a coloring agent, or dye. The light energy coupling substance causes the alumina substrate to rapidly heat up to and beyond its melting point of 2,330° K (3,734° F.) upon impingement of the laser beam, facilitating high-throughput, precise machining of the substrate. In the embodiment described herein, the light energy coupling substance comprises a substance that can sufficiently penetrate the surface of the ceramic substrate to reduce the reflectivity and enhance the energy absorption of the substrate. "Light energy coupling substance," as defined for purposes of the invention, comprises a substance that will selectively reduce the reflectivity of the substrate to light of a selected wavelength, and enhance the energy absorption of the substrate, thereby enabling micro-machining of a ceramic substrate using a laser light beam having a wavelength in a near-infrared, mid-infrared, and/or far-infrared light spectrum, corresponding to wavelengths ranging from around 0.610 micron to slightly greater than 15 microns.

An optical isolator can optionally be utilized in the light path between the laser and the substrate material to prevent laser beam reflections off the material from entering the laser and interfering with the laser beam.

There are several terms used herein, the definitions of which will assist in an understanding of the invention, and which are set forth below in Table 1:

TABLE 1

| | Definitions |
|---|---|
| Alumina | Bulk aluminum oxide ($Al_2O_3$); a micro-crystalline compound of $Al_2O_3$ that typically has been sintered into a thin, hard ceramic plate. |
| $CO_2$ Laser | A laser using carbon-dioxide ($CO_2$) gas to produce light with a wavelength of 10.6 micron (0.000,417 inch). Capable of high power with a quality and generally stable beam shape. |
| Ceramic | A family of materials comprised of powdered minerals or metal-oxides that have been sintered (fused) into a dense solid mass that still retains a certain degree of granularity or micro-crystalline structure, as opposed to materials that have been fully melted into a glass or other uniform solid. "Ceramic" herein refers to highly refined materials created for use in precision applications such as the electronics industry. |
| Gaussian/dot-mode | Also referred to as a "TEM-00" mode. A laser beam energy profile that has the shape of a bell-curve. The profile has a single point of maximum energy located in the center of the beam with a smooth, uniform sine-cosine taper to zero power at the outer beam edges. Because the term "Gaussian" is a mathematically defined shape, and most lasers do not exactly produce such a profile, these are more accurately called "dot-mode" lasers. Lasers that produce a high-quality dot mode can be focused to a single point whose theoretical size is defined by the formula: R = 1.22*L*(f/D), where R = radius of the focus spot, mm; L = wavelength, mm; f = focal length, mm; and D = beam diameter, mm. |
| HAZ | Heat Affected Zone. When machining with any thermal process, some residual heat diffuses outwardly from the primary point of laser interaction into the adjacent material being processed. This residual heat may cause significant changes to the material such as partial melting and re-solidification, cracking, discoloration, etc. HAZ refers to these portions adjacent to the laser point that show measurable physical changes due to this diffusion of residual heat. |
| Infrared (IR), Near-infrared (NIR), Mid-infrared (MIR), Far-infrared (FIR) | "Infrared" refers to the entire spectrum of non-visible light with wavelengths ranging from around 0.610 micron to slightly greater than 15 microns. NIR, MIR, and FIR each refer to three loosely-defined regions of the infrared spectrum, with NIR being just below visible deep red, MIR falling in the middle of the range, and FIR having the longest wavelengths. IR wavelengths are typically sensed as "radiant heat." |

TABLE 1-continued

Definitions

| Term | Definition |
|---|---|
| Kerf | The width of the material removed by a cutting tool, such as a laser. |
| Micro-machining | The precise and controlled removal of material directly resulting in high accuracy parts, as opposed to gross material removal with little or no regard to the machined finish. Typical examples of micro-machining are scribing, cutting, drilling (trepanning & boring), and milling. |
| Micron or μm | One-millionth of a meter, equal to 0.0000393 inch. |
| Mil | One thousandth of an inch, or 0.001 inch |
| Mode or mode-shape | The physical energy distribution profile in a cross-section of a laser beam. |
| Multi or shotgun-mode | An energy profile characterized by multiple points of maximum and minimum energy. The face-on energy distribution of a laser beam often resembles the shot pattern produced by a shotgun. A multi-mode always focuses to a spot size that is some multiple of the minimum theoretical size given by the equation in "Gaussian/dot-mode" and, as a result, produces a far lower energy-density compared to a dot-mode beam. |
| Nd:YAG laser | A laser based on crystals of aluminum-garnet that have been doped with trace amounts of neodymium and yttrium to produce laser light at a wavelength of 1.06 micron (0.000042 inch). While capable of great power, its beam shape is inherently unstable as average power varies. |
| Scribing | A machining process used to prepare a material for separation in a later processing step. Scribing produces a series of holes, pits, or controlled-fracture sites that creates a line of stress in the material. Later processes apply a force to the stress lines to cause a controlled fracture of the material along the lines to separate the parts. |
| Singulate | To scribe a larger substrate into smaller panels. |
| Substrate | A thin flat panel of electronics-grade alumina typically between 5 mil to 80 mil thick and up to several inches long and wide. Such substrates are used as carriers and heat-spreaders for smaller devices that are mounted to them and produce significant heat which must be dissipated. Such devices include semiconductor components and devices such as LEDs, power integrated circuits, e.g. amplifiers, transmitters, voltage regulators, and high-speed signal processors. |
| TEM-00 | Transverse Electro-Magnetic mode. The spatial distribution of energy in a laser beam. The number following "TEM" represents the number of nodes or low-energy points in the X and Y planes. TEM-00 or Gaussian/dot-modes have a single point of maximum energy, with no low-energy nodes. |
| Via | A precision hole drilled, bored, or cut through a substrate to connect circuitry on one side of the substrate to circuits or electrical contacts on the opposing side. |
| Yb-fiber laser | A laser based on an optical fiber that has been doped with trace amounts of ytterbium. It produces a powerful yet very-high quality and stable beam shape at a wavelength that typically spans from 1.07 to 1.095 micron (0.0000421 to 0.000043 inch). |

Figure 2:
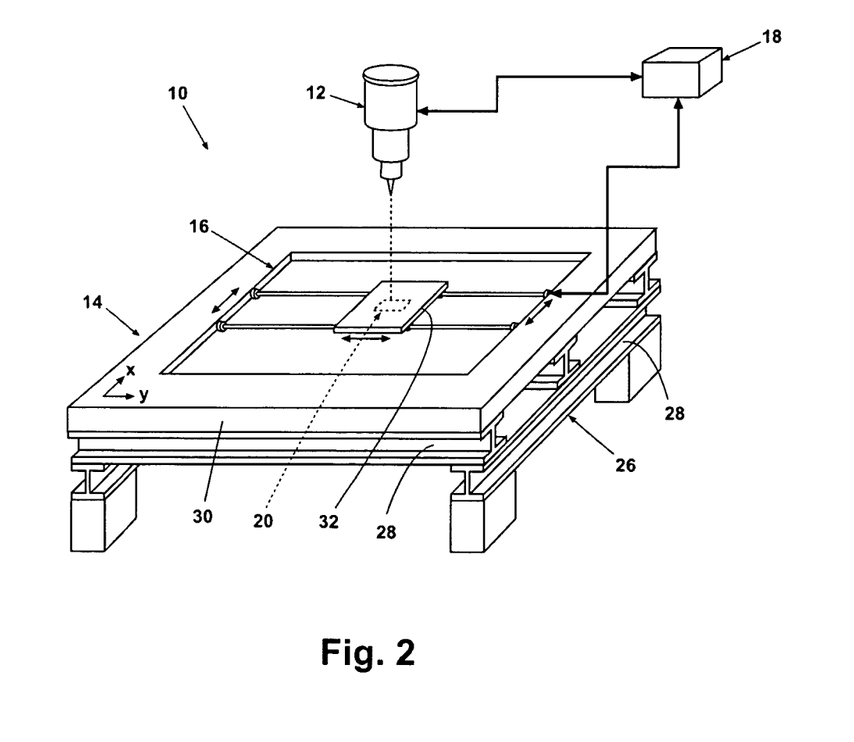
FIG. 2 is a schematic representation of a micro-machining workstation for micro-machining a workpiece comprising an alumina substrate with an applied light energy coupling substance according to an embodiment of the invention.
Figure 3:
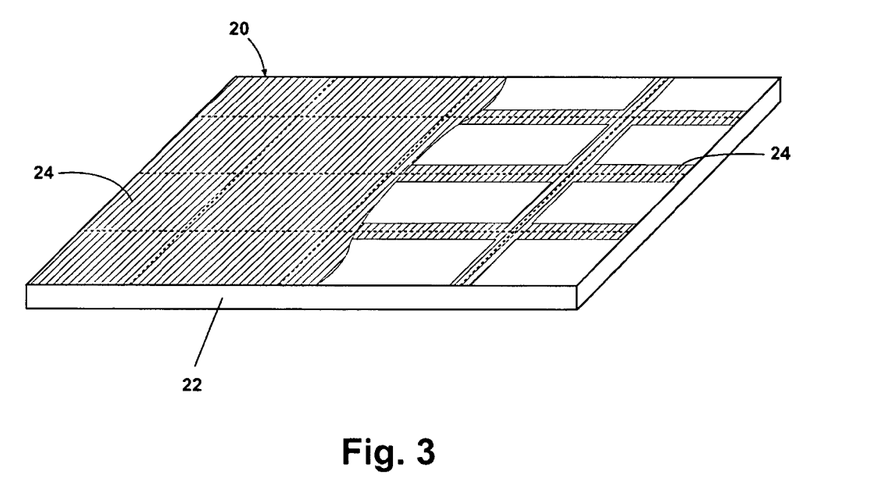
FIG. 3 is a schematic representation of the workpiece comprising an alumina substrate with an applied light energy coupling substance illustrated in FIG. 2.

As illustrated in FIGS. 2 and 3, an embodiment of the invention comprises an exemplary ceramics micro-machining workstation 10 comprising an ytterbium fiber laser 12, a base assembly 14, an X-Y motion system 16, a controller 18, and a prepared workpiece 20 comprising an alumina substrate 22 with an applied light energy coupling substance 24. The ytterbium fiber laser 12, or Yb fiber laser, can operate at NIR wavelengths of about 1.06-1.095 micron, at a power level of approximately 200 watts average power output in a TEM-00 mode.

The base assembly 14 is illustrated as comprising a high-mass table comprising a heavy frame 26, preferably fabricated of I-beams 28 having sufficient strength, rigidity, and inertial properties for the purposes described herein, supporting a granite slab 30 having a planar surface held to known exacting tolerances for planarity. The base assembly 14 will have a generally known stability and resistance to vibration sufficient for the purposes described herein.

The X-Y motion system 16 comprises a known fixture 32 suitable for engaging, supporting, and translating the ceramic substrate 22 for micro-machining operations by the laser 12 thereupon. The X-Y motion system 16 is supported upon the granite slab 30, and is capable of effecting selective precise movements of the prepared workpiece 20 in a horizontal plane parallel to the surface of the granite slab 30. The X-Y motion system 16 can effect selected incremental movements of the workpiece 20 of approximately 5 microns.

The controller 18 can comprise a known processor-based controller having suitable memory, operating software, and I/O devices for controlling the coordinated operations of the laser 12 and the X-Y motion system 16.

The workstation described herein is exemplary only, and other workstation components and configurations can be utilized without departing from or limiting the scope of the invention. For example, it is also customary to move the laser beam and keep the substrate stationary, known as "flying optics."

Referring specifically to FIG. 3, the prepared workpiece 20 comprises a known ceramic substrate 22, such as an electronics-grade alumina substrate, which has been selectively treated with an easily removable, low-mass light energy coupling substance 24 demonstrating relatively high absorption of light having an NIR wavelength. The substrate 22 is preferably chemically pure.

Preferably, the light energy coupling substance 24 will have at least a 50% absorption for the wavelength being generated. The light energy coupling substance 24 should be absorbable into the surface of the substrate 22, which will facilitate the coupling of the laser energy within the substrate. At the same time, the light energy coupling substance 24 should be readily removable, such as by rinsing with water, leaving no residue that could interfere with such operations as the printing and plating of circuit board components on the substrate 22.

The light energy coupling substance 24 should have a lack of grain structure so that the light energy coupling substance 24 is as fine as possible to provide a uniform color across the surface of the substrate 22, and minimize the scattering of light from the presence of relatively large particles in the light energy coupling substance 24. The light energy coupling substance 24 can be run through a filtering process prior to its application to the substrate 22 to remove any unacceptably large particles. Preferably, the light energy coupling substance 24 will have a propylene glycol base, which will facilitate the even spreading of the light energy coupling substance 24 over the surface of the substrate 22 and is itself a strong absorber of NIR light. In the preferred embodiment, a blue food-grade coloring is used as the light energy coupling substance 24. Other light energy coupling substances, such as aniline dyes, can be used which provide an equivalent wavelength absorption, uniformity, surface penetration, removability, and efficacy as the blue food-grade coloring.

The light energy coupling substance 24 can be applied over the entire surface of the substrate 22, as illustrated along the left portion of the workpiece 20 of FIG. 2, or applied only along the areas of the workpiece 20 on which the laser is to operate, as illustrated along the right portion of the workpiece 20 of FIG. 2.

The process of utilizing the Yb fiber laser 12 to micro-machine an alumina substrate will now be described. The inherently high reflectivity of alumina at NIR wavelengths is addressed by utilizing the reduced optical reflectivity of alumina once it is heated past its melting point of 2,330° K (3,734° F.). Once melted, the reflectivity of alumina drops by a factor of 30 to 40, greatly enhancing the transfer of energy from the laser beam to the substrate.

To initially bring the alumina up to the requisite melting temperature a high-energy spike at the leading edge of the laser pulse is used, coupled with the modification of the substrate surface using the light energy coupling substance 24. Typically, lasers utilized for micro-machining are configured so that the high-energy spike is suppressed. The Yb fiber laser 12 comprising a part of the invention is configured to retain the high-energy spike. The high-energy spike is a characteristic of the electrical surge resulting from switching the laser from an "off" condition to an "on" condition, and is approximately 10 times the rated power of the laser. Thus, for a 200 watt (W) laser, a high-energy spike of approximately 2 kilowatts, or 2 kW, will be generated. This 2 kW energy spike can have a duration of approximately $8 \times 10^{-6}$ second, contrasted with a total pulse duration of $40 \times 10^{-6}$ second.

The type of machining being performed will also determine the pulse duration and power usage. For cutting operations, 75 to 100% of full power, i.e. 150-200 W, is utilized, with a pulse duration of about $100\text{-}500 \times 10^{-6}$ second. The duration of time between pulses can be approximately 6 times the pulse duration. Thus, for an "on" pulse of $100 \times 10^{-6}$ second, the "off" time between pulses can be approximately $600 \times 10^{-6}$ second. Scribing operations can be conducted using full power, i.e. 200 W, with a pulse duration of $20 \times 10^{-6}$ second. The "off" time is dependent on the speed of the scribing operation, but will typically be about 50% of the "on" pulse duration. By increasing power, the speed of the scribing operation can be increased.

The light energy coupling substance 24 is applied to the substrate 22 prior to the machining process to alter the light absorption characteristics of the surface of the substrate 22 to encourage the laser beam at the shorter wavelength to perform the desired manufacturing operations thereon. The light energy coupling substance 24 essentially changes the way the laser light energy is coupled with the substrate 22 during machining operations using the laser, and thus should be wavelength-selective. It is desired to increase the coupling of laser light energy with the substrate 22, and to decrease the transmission of the laser light through the substrate 22 in order to increase the power from the laser light being delivered to the substrate surface. In effect, the light energy coupling substance 24 acts to discourage the laser light from passing through the substrate 22 and performing no machining operations.

The following will describe an embodiment of the process of micro-machining a substrate utilizing an ytterbium fiber laser.

The substrate is prepared by applying the light energy coupling substance 24 to the working surface. The light energy coupling substance 24 is applied to a bare, clean substrate 22 in a very thin layer, e.g. less than 1 micron (0.0000393 inch) thick, and allowed to dry. To minimize the quantity of light energy coupling substance applied and reduce waste, the light energy coupling substance 24 can be applied by a known fine spray technique. Alternately, other methods of applying a liquid can be employed, such as a simple dip or flood process. The light energy coupling substance 24 can also be applied immediately before micro-machining with the laser 12, or the substrate production company can pre-print the light energy coupling substance on the substrate at the time the substrate is fabricated.

The substrate 22 is then micro-machined by the laser 12 operating as a selected sequence of precisely-controlled pulses of laser light. During an "on" pulse, the laser produces a point of light acting on the surface of the substrate, which produces a "skin" of intensely hot material in the areas treated with the light energy coupling substance. The light energy coupling substance 24 facilitates the coupling of the laser energy with the surface of the substrate 22, thereby raising the temperature of the substrate 22 at the laser beam light point. This "skin" of heated material heats the alumina directly beneath it, raising the temperature to that at which the optical properties of the alumina change, at which point the laser energy is transferred more efficiently into the underlying substrate material. Provided that a laser with sufficient power and a stable TEM-00 beam shape is used along with the above-described power and pulse parameters, the process continues until the laser pulse ends or the material is pierced. The power and pulse parameters will vary with the material and the structure to be machined. The pulse must be of sufficient duration to vaporize the material, but not so long as to result in an unacceptably large HAZ. The power and pulse parameters will also be selected to optimize the speed at which the micro-machining process can proceed.

During an "off" pulse, the substrate 22 is positioned for the next "on" pulse. The sequence continues until the structural feature has been micro-machined into the substrate. After all laser micro-machining is completed, the light energy coupling substance 24 can be removed by a warm water rinse. The substrate 22 can then be separated along the micro-machined break lines into individual circuit boards, or can be further processed by the addition of electronics components, such as integrated circuits.

Alternately, the light energy coupling substance 24 can be applied later in the processing cycle in a preselected pattern, which enables "post-scribing" or "post-processing" of the circuit board. Specifically, instead of a typical laser scribing operation being performed at the same time as the micro-machining of features relatively early in the production stages, post-scribing is carried out at a much later stage in the production process.

When post-scribing is practicable, the advantage is that the full size substrate panels remain intact and at full mechanical strength throughout most of the manufacturing processes, in contrast with current methods wherein most of the manufacturing processes are carried out after scribing, on substrates that are far more fragile and difficult to handle. Because the invention enables the fabrication of smaller structural features, including scribing features, deep scribes are practicable, including complete penetration of the substrate, enabling highly accurate separation of assemblies built on the substrate panels.

Because each step in the process subsequent to the laser micro-machining process adds value to the substrates, premature breakage or separations of the substrates during these later steps that results in unusable product will increase costs due to the wasting of product the later in production the breakage occurs. Post-scribing helps ensure that the substrate survives intact during the entire manufacturing process until the full panel is singulated into the fully or nearly-fully finished individual units.

Post-scribing is not practicable in a mass-production environment using conventional $CO_2$ lasers because such a process produces large quantities of debris, i.e. spatter, from the violent ejection of vaporized and/or molten material being removed, and significant HAZ widths. If laser operations are performed in later stages, debris and HAZ generation can cause damage to previously-fabricated assemblies. With the Yb fiber laser and light energy coupling substance technique described herein, the laser can be used to drill the vias on a larger substrate blank, printing and plating operations can be performed to deposit the circuit board components onto the substrate, and the substrate can be perforated following the printing and plating operations. The substrate can have pre-printed lines of light energy coupling substance extending along the scribe line locations, the substrate can be provided with light energy coupling substance prior to all manufacturing operations, or the substrate can be "post-scribed" in which light energy coupling substance lines are laid down before the formation of the scribe lines and after the manufacturing processes being performed on the substrate.

Using the Yb fiber laser and light energy coupling substance as described herein, the scribe lines are approximately 3-5 microns in width, which means significantly less material is removed. If a kerf of 25 microns is typically formed using a diamond saw, in a substrate with 5 to 10 circuit boards formed therein, 20 microns per scribe line can enable additional circuit boards to be manufactured and less material wasted during preparation and separation of the individual circuit boards from the substrate.

Figure 4:
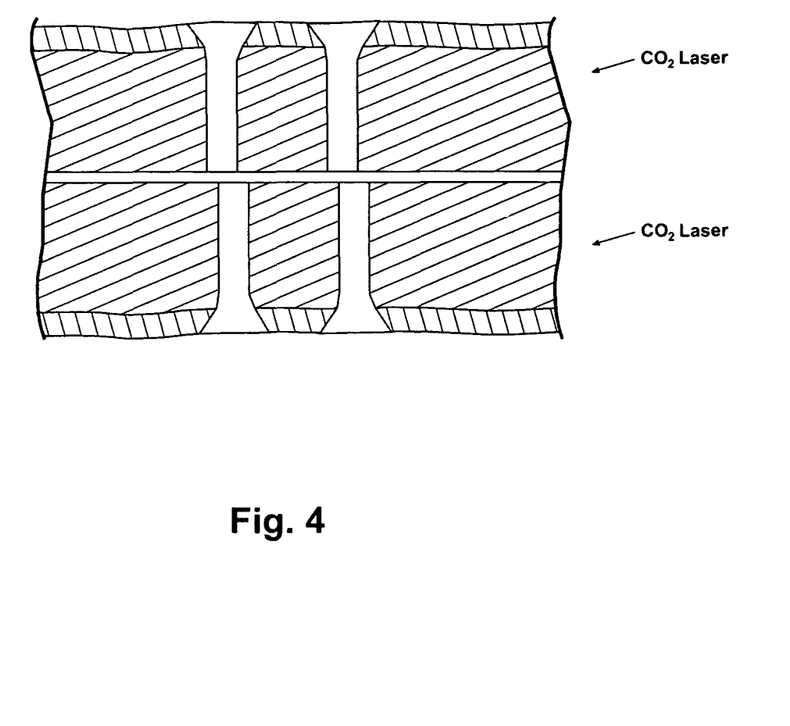
FIG. 4 is a microphotograph of a sectioned ceramic substrate having vias produced utilizing a $CO_2$ laser.
Figure 5:
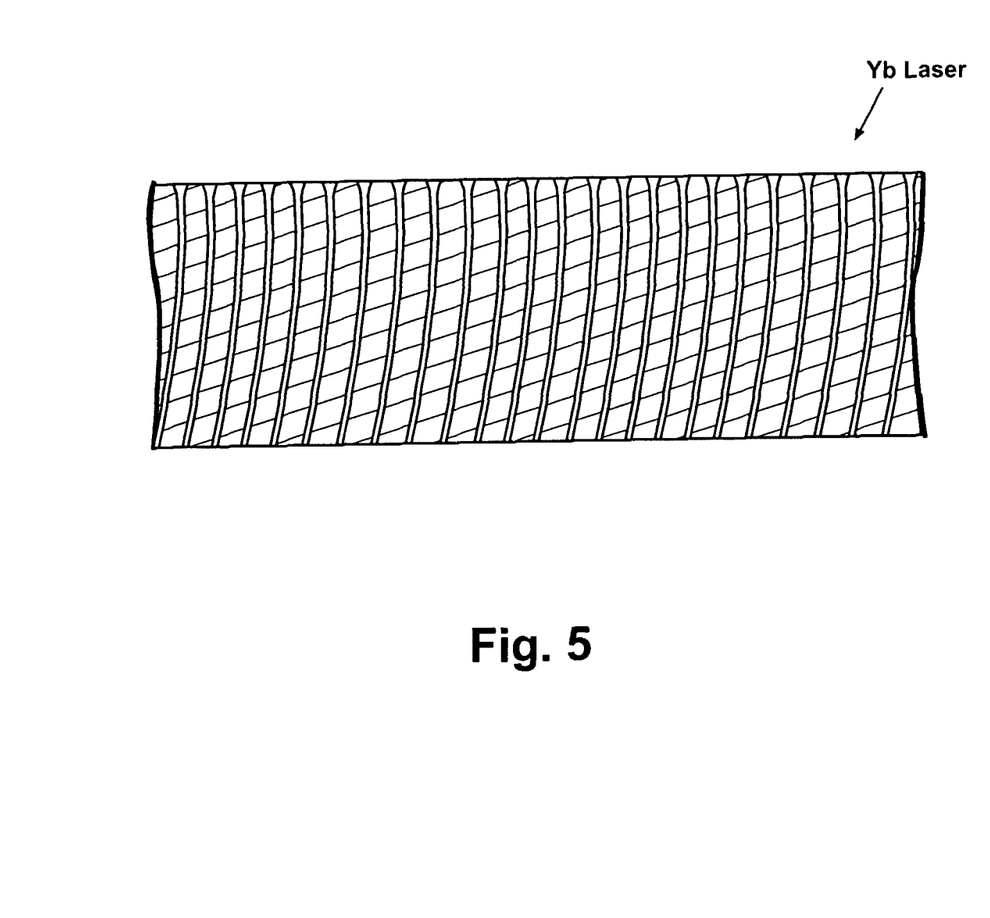
FIG. 5 is a microphotograph of a sectioned ceramic substrate having an array of vias produced with an Yb fiber laser according to the invention.
Figure 6:
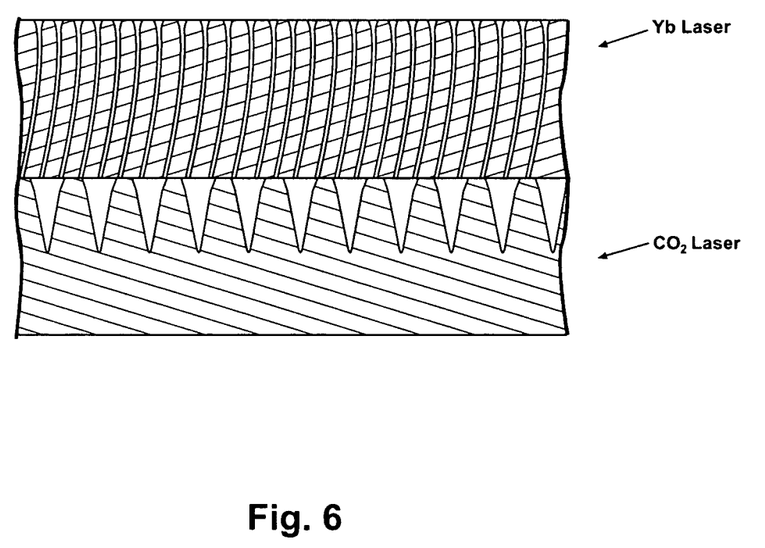
FIG. 6 is a composite microphotograph of sectioned ceramic substrates illustrating the difference in laser scribes utilizing a $CO_2$ laser and an Yb fiber laser according to the invention.

FIG. 4 is a microphotograph of a sectioned ceramic substrate having 3 mil diameter vias extending therethrough. The vias were produced utilizing specialized low production volume $CO_2$ laser techniques. FIG. 5 is a microphotograph of a sectioned ceramic substrate having an array of vias produced with an Yb fiber laser according to the invention. FIG. 6 is a composite microphotograph of sectioned ceramic substrates illustrating the difference in laser scribes utilizing a $CO_2$ laser and an Yb fiber laser according to the invention. The array of scribes illustrated in the upper half of the microphotograph was produced utilizing an Yb fiber laser according to the invention. The array of scribes illustrated in the lower half of the microphotograph was produced utilizing a $CO_2$ laser. The scribes produced utilizing the Yb fiber laser according to the invention have a substantially finer diameter, and greater substrate penetration, than the scribes produced utilizing the $CO_2$ laser. The Yb fiber laser scribes were also produced at a speed 1.5 times the speed of producing the $CO_2$ laser scribes.

Figure 7:
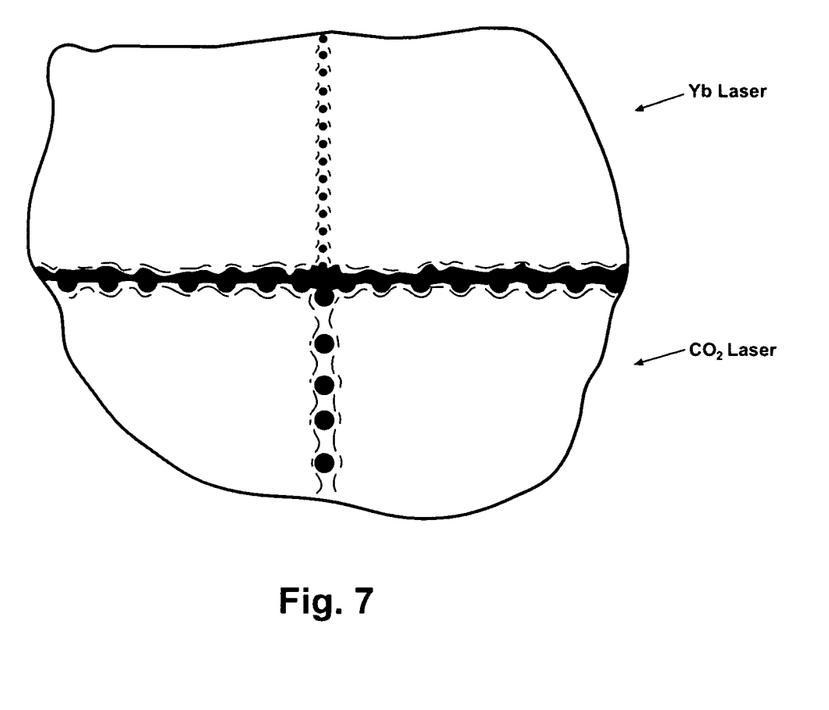
FIG. 7 is a composite microphotograph of the surfaces of substrates processed with an Yb fiber laser according to the invention and a $CO_2$ laser.

FIG. 7 is a composite microphotograph of the surfaces of substrates processed with an Yb fiber laser according to the invention and a $CO_2$ laser. The substrate in the upper half of the microphotograph was processed with the Yb fiber laser, and illustrates a scribe line extending vertically; the substrate in the lower half was processed with the $CO_2$ laser, and illustrates a scribe line aligned generally with the upper scribe line. Similar to the illustration in FIG. 6, the scribes produced utilizing the Yb fiber laser have a substantially finer diameter, and are spaced closer together. The horizontal lower edge of the upper substrate processed with the Yb fiber laser was formed by separating the substrate along a scribe line similar to the vertical scribe line illustrated in the upper substrate. The horizontal upper edge of the lower substrate processed with the $CO_2$ laser was formed by separating the substrate along a scribe line similar to the vertical scribe line illustrated in the lower substrate. The lower edge of the upper substrate is finer than the upper edge of the lower substrate due to the finer scribe diameter, and closer spacing, of the Yb fiber laser scribes.

Much finer kerf and HAZ formations result from the use of shorter wavelengths. This results in a lower quantity of substantially less-energetic and damaging debris. Negligible quantities of easily controlled spatter and HAZ are produced during the process described herein.

The process described herein also enables the manufacturing advantages of post-scribing/singulation to be applied to a far wider range of product-price tiers, and limits the use of saws and other lower-damage methods to only the highest-value products requiring the utmost precision. The process described herein results in higher production speeds, smaller scribe (perforation) lines, and smaller vias. This invention also allows for higher production speeds, for example, in excess of 1300 inches per second.

While the invention has been specifically described in connection with certain embodiments thereof, it is to be understood that this is by way of illustration and not of limitation. Reasonable variation and modification are possible within the scope of the forgoing description and drawings without departing from the spirit of the invention, which is described in the appended claims.

What is claimed is:

1. A method of micro-machining, comprising the steps of:
   applying a liquid light energy coupling substance to a substrate comprising a generally thin panel of alumina having an outer surface with a plurality of microscopic pores extending through the outer surface, wherein: (1) the light energy coupling substance absorbs a laser light beam at a selected wavelength, and (2) the liquid light energy coupling substance has a viscosity sufficiently low and a particle size sufficiently small so that the liquid light energy coupling substance penetrates the plurality of microscopic pores in the substrate to a depth beneath the outer surface of the substrate;
   directing a laser light beam at the selected wavelength against the substrate to raise the temperature of at least a portion of the substrate to at least the vaporization temperature of the alumina in that portion of the substrate; and
   manipulating one of the laser light beam and the substrate at selected locations where the liquid light energy coupling substance has penetrated the substrate to micro-machine features into the substrate at the selected locations.

2. The method of claim 1, wherein the light energy coupling substance causes the alumina to heat up to at least 3,734° F. more rapidly upon the impingement of the laser light beam than if the light energy coupling substance were not applied to the substrate.

3. The method of claim 1, wherein the laser light beam operates in a TEM-00 or Gaussian/dot mode.

4. The method of claim 1, wherein the laser light beam emanates from an ytterbium fiber laser.

5. The method of claim 1, wherein the laser light beam has a wavelength in the range of 1.07-1.095 microns.

6. The method of claim 1, wherein the light energy coupling substance causes the substrate to ablate more readily upon the impingement of the laser light beam than if the light energy coupling substance were not applied to the substrate.

7. The method of claim 1, further including the step of directing a high-energy spike of laser light power to the substrate at the beginning of the directing of the laser light beam against the substrate.

8. The method of claim 1, wherein the step of micro-machining is performed before electronic components are attached to the substrate.

9. The method of claim 1, further including the step of removing the light energy coupling substance from the substrate with an aqueous-based solution following the step of micro-machining the substrate.

10. The method of claim 1, wherein at least 50 percent of the laser light beam is absorbed in bulk volume beneath the outer surface of the substrate.

11. The method of claim 1, wherein the light energy coupling substance is applied to the outer surface of the substrate upon which the laser light beam impinges.

12. The method of claim 1, wherein the light energy coupling substance modifies one of the energy absorption of the substrate and the transmission of the laser light beam through the substrate.

13. The method of claim 1, wherein the light energy coupling substance couples the laser light beam with the substrate.

14. The method of claim 1, wherein the light energy coupling substance comprises a coloring agent selected from the group consisting of a water-based food coloring, a propylene glycol-based food coloring, and an aniline dye.

15. The method of claim 14, wherein the selected wavelength is in the near infrared region of the electromagnetic spectrum.

* * * * *